May 8, 1962  J. C. BONADIMAN  3,033,191
BROILING APPARATUS
Filed May 2, 1960

JOSEPH C. BONADIMAN
INVENTOR
HUEBNER & WORREL
ATTORNEYS
BY
Richard M. Worrel

United States Patent Office 3,033,191
Patented May 8, 1962

3,033,191
BROILING APPARATUS
Joseph C. Bonadiman, 3468 E. Clinton, Fresno, Calif.
Filed May 2, 1960, Ser. No. 26,280
9 Claims. (Cl. 126—25)

The present invention relates to a broiling apparatus adapted to employ a solid carbonaceous fuel, such as charcoal, and, more particularly, to such an apparatus for extinguishing the broiling fire immediately subsequent to use in an automatic, safe, and sanitary manner, for washing the interior of the broiler, for readily disposing of the ashes produced by the burned fuel as well as other waste matter in the broiler, and for retaining unburned portions of the fuel for subsequent use.

Conventional charcoal broilers are usually stationary installations constructed of brick, portable units made of metal, or simple holes dug in the ground for the purpose. In essence, all of the known charcoal broilers provide pits adapted to receive charcoal, a grate elevationally adjustably overlying the pit for supporting meat in direct exposure to the burning charcoal, and perhaps a hood and/or a chimney for carrying away the gaseous products of combustion.

After meat is barbecued in such a conventional broiler, it is removed from the grate but the charcoal is usually allowed to burn completely into ash even though considerable unburned charcoal may remain in the pit at the time the cooking operation is completed. This is an obviously undesirable waste.

Also, because such charcoal broilers and the grates thereof are quite hot when the cooked meat is removed, and because of the inconvenience at a time when it is usually desired to eat, the unit is seldom cleaned until it has cooled. Of course, cooling causes grease, meat particles, and the like, to solidify and harden on the internal surfaces of the broiler thereby making cleaning more difficult. Under the best of conditions, the cleaning by hand of a broiler or charcoal grate including its individual grids is a tedious operation. The subject invention is believed to overcome these and other problems with broilers of the prior art.

Accordingly, it is an object of the present invention to provide a broiling apparatus having provision for the controlled quenching of fire therein.

Another object is to provide a solid fuel broiling apparatus capable of readily disposing of its ashes and waste matter.

Another object is to provide a solid fuel broiling apparatus which retains for susequent use portions of the fuel which are unconsumed when any cooking operation is completed.

Another object is simultaneously to quench the fire and flush ashes down a drain in a broiling apparatus.

Another object is to provide a broiling apparatus with a charcoal igniting, electrical conductor which is automatically de-energized at a predetermined maximum temperature within the broiler.

Another object is to provide a broiling apparatus of the nature described which includes a switch for de-energizing the electrical igniting conductor during said quenching and flushing.

Another object is to provide a broiling apparatus capable of automatically cleaning the interior thereof when manually triggered for such purpose.

Another object is to release pressure built up within such a broiling apparatus during said quenching, cleaning, and flushing operations.

Another object is to provide a broiling apparatus suited to embodiment in portable as well as permanently installed forms, indoor and outdoor forms, as well as in forms of a variety of sizes.

These, together with other objects, will become more fully apparent upon reference to the following description and accompanying drawing.

Figure 1:
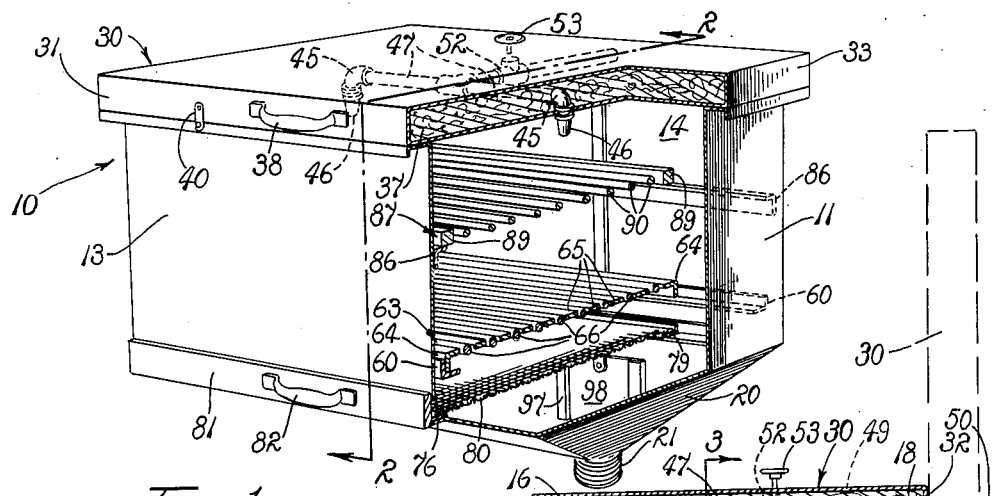
FIG. 1 is a perspective view of a broiling apparatus embodying the principles of the present invention and being partially broken away to show the interior construction of the apparatus.
Figure 4:
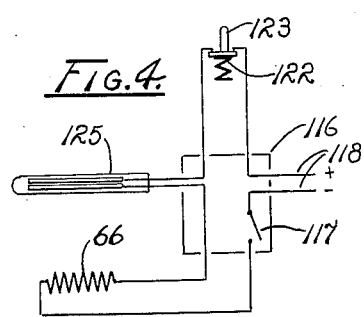
FIG. 4 is a schematic representation of an electrical circuit used with the apparatus.

Referring more particularly to the drawing, the broiling apparatus of the subject invention includes a housing 10 having opposed side walls 11 and 12, and opposed front and rear walls 13 and 14 interconnected in rectangular relation. The front, rear and side walls are preferably disposed in upright positions circumscribing an upper opening 16. The upright walls have laterally outwardly extended, horizontal upper flanges 18 disposed in a substantially common plane.

The housing 10 also includes a funnel-shaped bottom wall 20 connected to the upright walls 11, 12, 13 and 14 and downwardly convergently extended therefrom to a lower drainage outlet 21 preferably adjacent to the plane of the rear wall. This outlet is adapted for connection to a drain pipe 23 leading to a sewer, not shown, of a city disposal system, for example. Alternatively, if the apparatus is employed as a portable unit, element 23 is preferably a flexible hose opening into any convenient disposal area. The housing 10 is preferably mounted on a support wall, generally indicated by the numeral 25 in dashed lines in FIG. 2. The subject apparatus is suitable for use either indoors or outdoors whether a permanent installation or portable.

The housing 10 further includes a substantially rectangular cover 30 having front, rear, and side edges 31, 32, and 33, respectively. The rear edge of the cover is connected to the upper flange 18 of the rear wall 14 by an elongated hinge 35 for pivoting movement of the cover between a closed position over the opening 16 rested substantially horizontally on the upper flanges, and an open position preferably extended substantially vertically upwardly from the rear wall, as illustrated in dashed lines in FIG. 2. The cover is hollow and contains insulation 37. A handle 38 is connected to the front edge of the cover, and a latch 40 is provided on the cover and the front wall 13 for releasably securing the cover in closed position.

A pair of spray heads 45 is mounted in the cover 30 and each includes a nozzle 46 directed downwardly into the housing 10 in the closed position of the cover. A conduit 47 interconnects the spray heads, and a supply duct 49 is connected to the conduit. A delivery hose 50 is connected to the duct and has an opposite end connected to any suitable source of quenching and flushing fluid under pressure, such as a domestic water system. A spray control valve 52 is provided in the supply duct and includes a valve handle 53 upwardly extended through the cover. The valve has an open position admitting fluid under pressure to the spray heads and a closed position precluding the flow of fluid to said heads.

Figure 3:
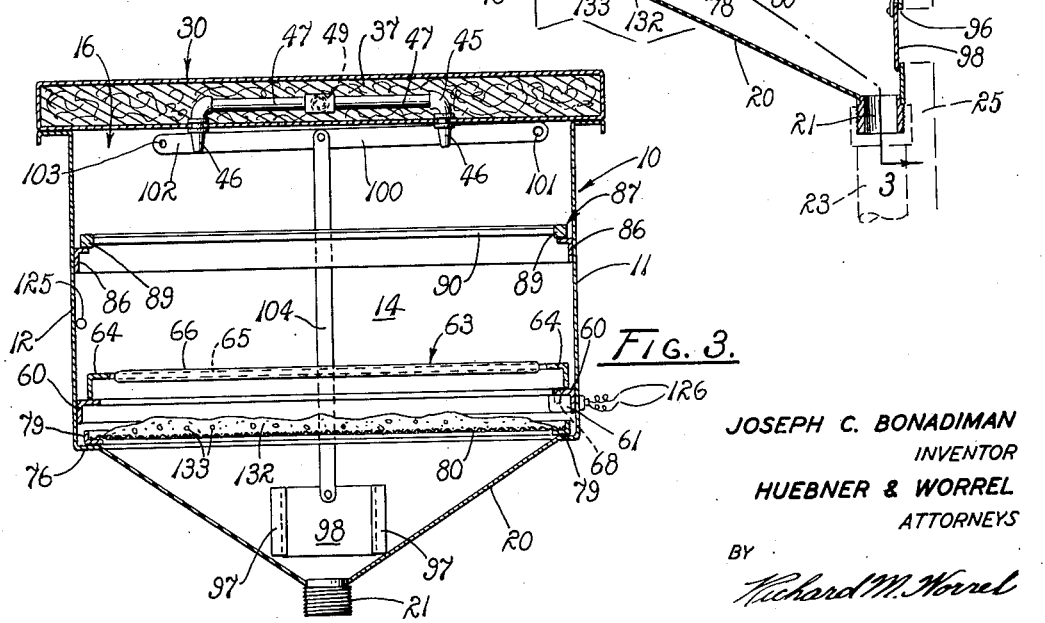
FIG. 3 is a longitudinal section taken on a plane at a position represented by line 3—3 in FIG. 2.

Opposed lower grate brackets 60 are secured to the inside surfaces of the front, rear and side walls, 11, 12, 13 and 14. A water-tight electrical receptacle 61 is mounted in one of these brackets adjacent to the side wall 11, as shown in FIG. 3. A charcoal grate 63 includes a rectangular frame 64 slightly smaller than the housing 10, a plurality of elongated, substantially flat transversely spaced charcoal support bars 65 extended longitudinally between opposite sides of the frame, a charcoal igniting, resistance element 66 borne by the frame in closely adjacent spaced relation to the bars, and a pair of electrical contact prongs 68 connected to the resistance element. The charcoal grate is releasably supported on the grate brackets with the prongs releasably received in electrically contacting relation in the receptacle, and with the bars disposed in substantially horizontal position between the opening 16 and the outlet 21 of the housing 10.

It is to be noted that the front wall 13 of the housing 10 has an elongated, longitudinally, substantially horizontally extended, slot 75 below the lower grate brackets 60 and leading into the housing. Tray brackets 76 are provided on the rear wall 14 and the bottom wall 20 in a substantially common horizontal plane below the grate brackets and in horizontal alignments with the slot. A collection tray 78 is slidably extended through the slot and includes a substantially rectangular frame 79 mounting a fine mesh screen 80 therein, a front panel 81 connected to the frame, and a handle 82 secured to the panel. The frame is slidably rested on the tray brackets and the tray is thus movable between a collecting position extended into the housing between the charcoal grate 63 and the outlet 21, and a retracted position extended outwardly and withdrawn from the housing. When the tray is in collecting position, the front panel is in flush engagement with the front wall over the slot.

Upper grate brackets 86 are secured to the upright walls 11, 12, 13 and 14 above the lower brackets 60 and in a substantially common horizontal plane. A rectangular broiler grate 87 smaller than the housing 10 is releasably supported on the upper brackets. The broiler grate includes a frame 89 and a plurality of elongated, transversely spaced, longitudinally extended rods 90 mounted within the frame 89.

The rear wall 14 of the housing 10 has a draft port 96 therein between the outlet 21 and the charcoal grate 63 and at the rear of the housing. Channel-forming guides 97 are connected to the rear wall on opposite sides of the port, and a damper plate 98 is slidably fitted between the guides and the rear wall for movement between positions opening and closing the port. An elongated lever 100 has an end 101 pivotally connected to the rear wall 14 adjacent to its upper flange 18 and an oppositely extended handle 102. The handle provides an aperture 103 to facilitate lifting of the handle by a hooked wire, or the like, not shown. An elongated link 104 pivotally interconnects the lever and the plate whereby the plate is moved between said opening and closing positions incident to raising and lowering the lever about its pivoted end 101. Since the lever is in the path of movement of the cover 30, if the lever is extended up when the cover is open, said lever is pushed downwardly by engagement of the cover with the lever. This insures closure of the port 96 whenever the cover is closed. When the plate is in open position, draft currents pass upwardly through the housing from the port, through the tray 78, the charcoal and broiler grates 63 and 87, and eventually through the opening 16, that is, assuming the cover is open.

A pressure release vent pipe 110 is connected to a side wall 11 and provides communication between the atmosphere and the interior of the housing 10. A unidirectional pressure relief valve 111 is connected in the vent pipe. The relief valve is spring-urged into closed position but is adapted to open incident to application of sufficient pressure thereagainst to allow built-up pressure within the housing to escape to the atmosphere through the vent pipe.

Figure 2:
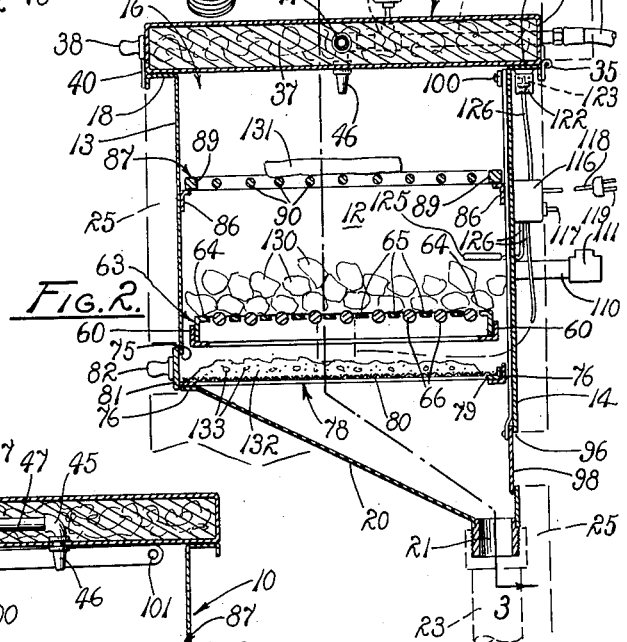
FIG. 2 is a transverse section taken on a plane represented by line 2—2 in FIG. 1, showing the apparatus mounted in a support, indicated in dashed lines, showing a cover for the apparatus in open position in dashed lines, showing charcoal, ash therefrom, and meat in appropriate positions within the apparatus, and showing a drain pipe in dashed lines connected to the apparatus.

As best illustrated in FIG. 2, an electrical system is used with the subject apparatus and includes a connector box 116 secured to the exterior of the rear wall 14 of the housing 10. A main control switch 117 is mounted in the box, and an extension cord 118 is connected to the main switch. A plug 119 is connected to the cord for insertion into an electrical outlet, not shown, for supplying electrical power to the system. A safety switch 122 is mounted under the upper flange 18 of the rear wall and includes a button 123 upwardly extended through this flange. The safety switch is spring-urged into closed position but is opened incident to depression of the button. It is to be noted that the button is in the path of movement of the cover 30 and is engageable therewith for depressing the button when the cover is in closed position. Also, a thermostatic switch 125 is mounted on the inside surface of one of the side walls 12. Electrical wiring 126 connects the main switch, the safety switch, the thermostatic switch, and the electrical receptacle 61 in series circuit with the extension cord 118.

*Operation*

The operation of the described embodiment of the subject invention is believed to be readily apparent and is briefly summarized at this point. With the broiler grate 87 removed, charcoal 130, wood chips, or other desired fuel, is placed on the charcoal grate 63, and thereafter the broiler grate is replaced. Meat 131, for example, to be barbecued is then placed on the broiler grate. With the cover 30 and the damper plate 98 in open position, and with the tray 78 in its collecting position, the plug 119 is connected to a source of electrical energy, not shown, and the main switch 117 is turned on. The electrical resistance element 66 is then heated to ignite the charcoal. When the temperature within the housing 10 has reached a predetermined maximum, the thermostatic switch 125 opens to de-energize the element 66. Thereafter, the burning charcoal is the only source of heat. As the charcoal burns, ashes 132 and particles 133 of charcoal fall through the charcoal grate 63 onto the screen 80 where they collect, as illustrated in FIG. 2.

When the meat 131 is done, it is removed from the housing 10. The cover 30 is closed and latched. Closing of the cover disables the element 66 incident to depression of the button 123. Although the coil may not then be energized, this safety switch prevents it from being energized during the subsequent operation now to be described. Closing of the cover automatically moves the damper plate 98 into fully closed position over the draft port 96 since the cover engages the handle 102 of the lever 100 thereby pressing down on the link 104 as the cover is closed.

The valve handle 53 is rotated to open the spray control valve 52. Assuming the delivery hose 50 is connected to a source, not shown, of water under pressure, water is ejected from the nozzles 46 in diffuse sprays downwardly within and substantially entirely throughout the interior of housing 10. The water serves first of all to quench the burning charcoal 130. This also cools the walls 11, 12, 13, 14 and 20 so that there is no danger of being burned upon body contact with the housing 10. Of course, because of the insulation 37 in the cover 30, the handle 38 is not at an uncomfortable temperature to touch.

The spraying water also washes the grates 63 and 87, the element 66, and the inside surfaces of the walls 11, 12, 13, 14 and 20. Furthermore, the spraying water flushes the ashes 132 and other waste matter washed from the housing and grates downwardly through the tray 78 into the outlet 21 and thence to the sewer or other disposal area, not shown, through the drain pipe 23. It is to be noted that since the water quenches the burning charcoal, particles of unburned charcoal of salvageable size rest on the charcoal grate. That of minute particle size is washed downwardly into the outlet. If resultant gas pressure builds up in the housing to an undesirable predetermined amount, the valve 111 opens to relieve said pressure. The screen 80 retains most of the unburned charcoal of reusable value because of its fine mesh. Of primary significance, however, is the fact that the screen prevents particles of charcoal of any appreciable size from being flushed through the outlet and into such a sewer, no shown. If large chunks of charcoal were permitted to fall into the sewer or drain pipe 23, it is evident that clogging might result. The unburned charcoal remaining on the tray may be obtained by pulling the tray into its retracted position or completely removing it from the housing.

From the foregoing, it will be evident that a broiling apparatus has been provided which enables quenching of a fire therein immediately subsequent to use, washing of the interior of the apparatus promptly following use and before grease and meat particles, and the like, have had an opportunity to solidify and stick to the apparatus, and flushing of the ashes and waste matter out of the apparatus into a disposal drain. The apparatus controls the use of an electrical starter associated with the charcoal grate, precludes passage of oversized unburned charcoal particles into the drain system, automatically closes the damper before spraying takes place, cools the walls of the apparatus, immediately after use, and is generally safe, sanitary, and efficient in operation.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a broiler adapted to employ solid carbonaceous fuel, a housing having an upper opening and a lower drainage outlet; perforate means mounted within the housing between said opening and said outlet for supporting solid carbonaceous fuel; and spray means mounted in the housing and directed internally thereof for spraying a quenching fluid against the fuel on said perforate means, for washing the interior of the housing, and for flushing ashes and other waste matter through the drainage outlet, the housing also including a cover mounted for movement between a closed position over the upper opening during said spraying of quenching fluid and an open position displaced from said opening to release gaseous products of combustion during burning of the fuel.

2. The broiler of claim 1 wherein the housing has a vent, and including a pressure relief valve mounted in the vent having a normally closed position but being operable to release built-up gas pressure within the housing upon the development of such pressure during spraying of said quenching fluid on the carbonaceous fuel.

3. The broiler of claim 1 including an electrical system adapted for connection to a source of electrical power and having a fuel igniting element borne by said perforate means, a safety switch mounted on the housing having open and closed positions and being in electrical series circuit with the element, said safety switch including means yieldably urging the switch into closed position, and said cover including a portion engageable with the switch in the closed position of the cover for moving said switch into open position thereby to disable the element during spraying of the quenching liquid.

4. The broiler of claim 1 including a tray slidably mounted in the housing for movement between a collecting position interposed between the perforate means and the outlet and a retracted position withdrawn from the collecting position and outwardly extended from the housing, the tray including a perforate screen adapted to collect unburned carbonaceous fuel falling through said perforate means but to pass ashes dropping thereon from the burning fuel.

5. The broiler of claim 1 wherein the housing also has a draft port between the outlet and said perforate means for enabling air currents to pass upwardly from the port through the perforate means to the opening; and including a damper mounted on the housing for movement between a damping position over the port and a position retracted therefrom.

6. The broiler of claim 5 including a linkage movably mounted in the housing and connected to the damper for moving the damper between damping and retracted positions, the linkage extended out of the housing in the path of movement of the cover when the damper is in open position whereby closing of the cover engages the linkage automatically to move the damper into damping position.

7. A charcoal broiling apparatus comprising a housing having an upper opening, a lower drainage outlet, and a cover movable between a closed position over the opening and an open position upwardly displaced from the opening; a fuel supporting grate mounted in the housing in substantially horizontal position and adapted to support charcoal thereon; an electrical charcoal igniting element mounted on the grate; a broiling grate mounted within the housing in a substantially horizontal position above the fuel grate, the houisng having an elongated, substantially horizontally extended slot below the fuel grate and opening into the housing; a tray having a perforate screen slidably extended through said slot for movement between a collecting position extended into the housing between the fuel grate and the outlet for collecting ashes and charcoal dropping thereon from the fuel grate and a retracted position withdrawn and outwardly extended from the housing, the screen being adapted to pass said ashes therethrough but to retain charcoal of predetermined size thereon; a spray head mounted in the cover including a nozzle directed into the housing when the cover is in closed position; fluid conducting means including a control valve connected to the spray head and adapted for connection to a source of quenching liquid under pressure whereby a spray of quenching liquid is directed downwardly over and through the grates and the screen when the cover is closed for quenching the charcoal fire, for cleaning the walls of the housing and said grates, and for flushing ashes and waste matter downwardly through the screen and the bottom wall into the outlet; a vent pipe mounted in the housing providing communication between the interior of the housing and the atmosphere; and a safety valve connected in the pipe having a closed position but being openable incident to a rise of pressure internally of the housing when said quenching liquid contacts the charcoal.

8. A charcoal broiling apparatus comprising a housing having upright front, rear, and side walls interconnected in circumscribing relation to an upper opening, a funnel-shaped bottom wall downwardly extended from the front, rear and side walls to a drainage outlet, and a cover hinged to the rear wall for movement between a closed position over the opening and in engagement with the upright walls and an open position upwardly displaced from the opening; a fuel supporting grate mounted in the housing on said upright walls in substantially horizontal position including a plurality of elongated, transversely spaced bars longitudinally extended between opposed upright walls of the housing and adapted to support charcoal thereon; an electrical charcoal igniting element mounted on the grate in closely adjacent relation to the bars; the housing having a draft port located therein between the fuel grate and the outlet; guides mounted on the housing at opposite sides of said port; a damper plate slidably fitted in the guides for movement over the port; linkage means mounted on the housing and connected to the damper plate for moving the same between positions opening and closing the port; a broiling grate mounted within the housing in a substantially horizontal position on said upright walls above the fuel grate and including a plurality of elongated, transversely spaced rods longitudinally extended between a pair of opposed upright walls, the front wall of the housing having an elongated, substantially horizontally extended slot below the fuel grate and opening into the housing; a tray having a perforate screen slidably extended through said slot for movement between a collecting position extended into the housing between the fuel grate and the outlet for collecting ashes and charcoal dropping thereon from the fuel grate and a retracted position withdrawn and outwardly extended from the housing, the screen being adapted to pass said ashes therethrough but to retain charcoal of predetermined size thereon; a spray head mounted in the cover including a nozzle directed into the housing when the cover is in closed position; fluid conducting means including a control valve connected to the spray head and adapted for connection to a source of quenching liquid under pressure whereby a spray of quenching liquid is directed downwardly over and through the grates and the screen when the cover is closed for quenching the charcoal fire, for cleaning the walls of the housing and said grates, and for flushing ashes and waste matter downwardly through the screen and the bottom wall into the outlet; a vent pipe mounted in the housing providing communication between the interior of the housing and the atmosphere; and a safety valve connected in the pipe having a closed position but being openable incident to a rise of pressure internally of the housing when said quenching liquid contacts the charcoal.

9. The apparatus of claim 8 including an electrical system having a main control switch adapted to be connected to a source of electrical power, a safety switch mounted on one of the upright walls including a button upwardly extended from said wall for engagement by the cover in closed position to open the safety switch, and a thermostatic switch having open and closed positions mounted within the housing and connected in electrical series circuit with the main switch, the safety switch, and the igniting element for de-energizing said element when the temperature within the housing reaches a predetermined maximum.

References Cited in the file of this patent

UNITED STATES PATENTS

| | | |
|---|---|---|
| 397,709 | Filer | Feb. 12, 1889 |
| 741,474 | Ferry | Oct. 13, 1903 |
| 986,360 | Chambers | Mar. 7, 1911 |
| 2,110,798 | Henning | Mar. 8, 1938 |
| 2,726,653 | Strobel | Dec. 13, 1955 |
| 2,813,477 | Gaylord | Nov. 19, 1957 |
| 2,866,883 | Borden | Dec. 30, 1958 |